(12) United States Patent
Kasai

(10) Patent No.: US 7,732,983 B2
(45) Date of Patent: Jun. 8, 2010

(54) ULTRASONIC MOTOR

(75) Inventor: Yasuaki Kasai, Saitama (JP)

(73) Assignee: Olympus Corporation, Tokyo (JP)

( * ) Notice: Subject to any disclaimer, the term of this patent is extended or adjusted under 35 U.S.C. 154(b) by 9 days.

(21) Appl. No.: 12/272,159

(22) Filed: Nov. 17, 2008

(65) Prior Publication Data

US 2009/0140608 A1 Jun. 4, 2009

(30) Foreign Application Priority Data

Dec. 4, 2007 (JP) ............................. 2007-313880

(51) Int. Cl.
*H02N 2/00* (2006.01)
(52) U.S. Cl. .......................... 310/323.17; 310/323.02; 310/323.16
(58) Field of Classification Search ............ 310/323.01, 310/323.02, 323.08, 323.09, 323.11, 323.16, 310/323.17
See application file for complete search history.

(56) References Cited

U.S. PATENT DOCUMENTS

| | | | | |
|---|---|---|---|---|
| 5,982,075 | A | * | 11/1999 | Hayasaka .............. 310/323.01 |
| 6,979,395 | B2 | | 12/2005 | Pace et al. |
| 2005/0253484 | A1 | * | 11/2005 | Kishi et al. ............ 310/323.16 |
| 2009/0167112 | A1 | * | 7/2009 | Sakamoto .............. 310/323.16 |

* cited by examiner

*Primary Examiner*—Thomas M Dougherty
(74) *Attorney, Agent, or Firm*—Scully, Scott, Murphy & Presser, P.C.

(57) ABSTRACT

A ultrasonic motor includes a piezoelectric device, and friction contact members moves a driven body by a elliptical vibration. And the ultrasonic motor includes a holder member which is disposed corresponding to a node of a longitudinal vibration or in the vicinity thereof on the face of the piezoelectric device and a node of a flexural vibration or in the vicinity thereof, the holder member having an engagement convex portion and being provided with a pair of sliding contact projection portions, a position limiting member which has accommodation holes each constituted of a sliding contact concave portion for accommodating the sliding contact projection portion such that it makes a sliding contact therewith freely and an engagement concave portion for accommodating the engagement convex portion, and a pressure member which presses the holder member so as to bring the friction contact members into pressure contact with the driven body.

8 Claims, 2 Drawing Sheets

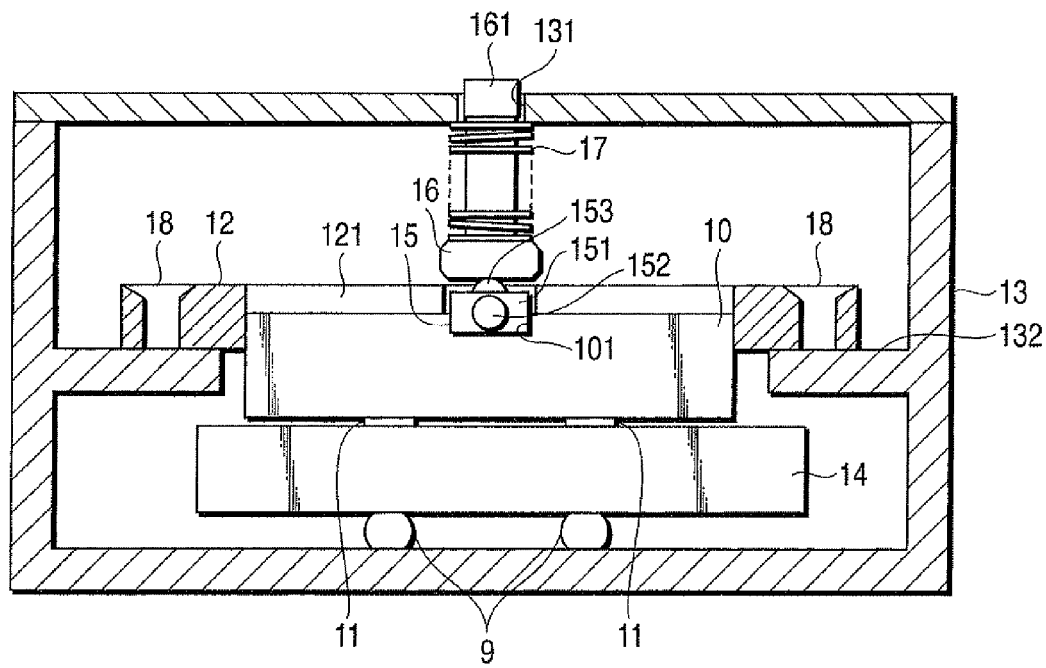
F I G. 1
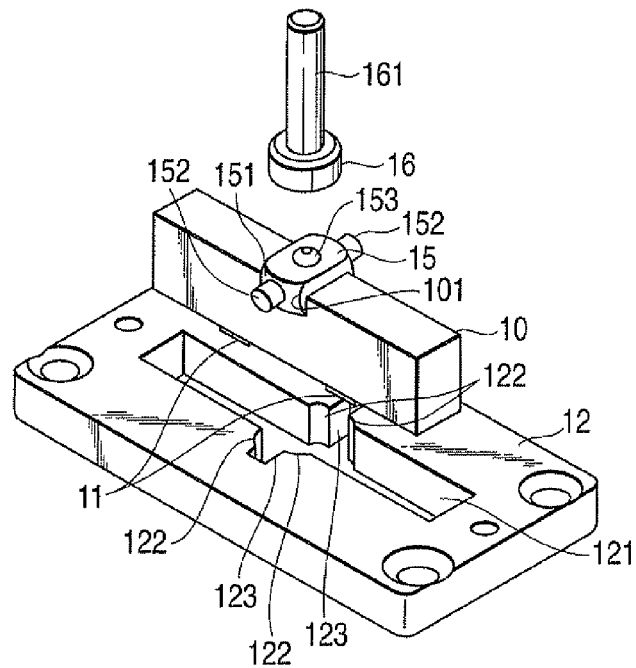
F I G. 2

ULTRASONIC MOTOR

CROSS-REFERENCE TO RELATED APPLICATIONS

This application is based upon and claims the benefit of priority from prior Japanese Patent Application No. 2007-313880, filed Dec. 4, 2007, the entire contents of which are incorporated herein by reference.

BACKGROUND OF THE INVENTION

1. Field of the Invention

The present invention relates to an ultrasonic motor for use as, for example, an image vibration correcting unit of a digital camera or an actuator of an autofocus (AF) lens or the like.

2. Description of the Related Art

Generally, when a voltage is applied to a piezoelectric device of the ultrasonic motor, longitudinal vibration and flexural vibration are induced, thereby producing elliptical vibration (oscillation). The ultrasonic motor transmits this elliptical vibration to a driven body via a driver so as to drive the driven body by friction. In such an ultrasonic motor, the piezoelectric device, which constitutes a vibrator, is disposed uniformly in contact with the driven body. Consequently, stable driving is achieved. Thus, a highly accurate contact (assembly) arrangement precision of the piezoelectric device with respect to the driven body in the ultrasonic motor affects the driving characteristic of the ultrasonic motor greatly.

Such a contact arrangement configuration has been disclosed in, for example, U.S. Pat. No. 6,979,935. According to U.S. Pat. No. 6,979,935, a plurality of concave portions are disposed at a predetermined interval in the vicinity of, for example, vibration nodes of a vibrator. These concave portions are disposed in a direction (pitch direction) perpendicular to the moving direction (roll direction). A plurality of convex portions provided on a supporting member engage the plural concave portions.

This supporting member is pressurized in the direction of the vibrator so that a frictional member which is a driver disposed on the bottom face of the vibrator is brought into contact with a contact member which is the driven body at a desired pressure. Consequently, when a vibration is induced in the contact member by the vibrator, the contact member is driven by friction via the frictional member.

As for the friction drive by such a vibrator, its drive efficiency can be enhanced as the contact between the frictional member and the contact member is kept uniform.

However, the configuration disclosed in U.S. Pat. No. 6,979,935 has a freedom only in the pitch direction of the contacts between the frictional member and the contact member and the configuration is set to be capable of making "profiling" actions only in the same direction. That is, the contact between the frictional member and the contact member is along the pitch direction. Thus, if any manufacturing error or assembly error is generated in components, the accuracy of contact between the frictional member and the contact member is worsened. For this reason, high processing and assembly accuracy of the components is required, so that manufacturing work including the processing and assembly is very troublesome, which is a problem to be solved.

BRIEF SUMMARY OF THE INVENTION

The present invention has been achieved in view of the above-described circumstances and an object of the invention is to provide an ultrasonic motor capable of improving the drive efficiency by achieving a simple and easy processing work and then enhancement of uniformity of assembly by maintaining excellent contact.

The present invention provides an ultrasonic motor which produces elliptical vibration by inducing longitudinal vibration and flexural vibration at the same time and drives a driven body by obtaining a drive power from the elliptical vibration, comprising: a piezoelectric device; friction contact members which are provided on one face of the piezoelectric device so as to move a driven body by the elliptical vibration of the piezoelectric device; a holder member which positions and holds the piezoelectric device in a casing and is disposed corresponding to a node of the longitudinal vibration or in the vicinity thereof on the other face of the piezoelectric device and a node of the flexural vibration or in the vicinity thereof, the holder member having an engagement convex portion at the front end portion thereof and being provided with a pair of curved sliding contact projection portions which are projected from two faces perpendicular to the moving direction of the driven body; a position limiting member which accommodates the piezoelectric device and has accommodation holes each constituted of a sliding contact concave portion for accommodating the sliding contact projection portion of the holder member such that it makes a sliding contact therewith freely and an engagement concave portion for accommodating the engagement convex portion of the sliding contact projection portion, the sliding contact concave portion and the engagement concave portion being provided in each of the inner wall faces in a direction perpendicular to the moving direction of the driven body; and a pressure member which presses the holder member so as to bring the friction contact members into pressure contact with the driven body.

With the above-described structure, the holder member provided on the piezoelectric device is pressed by the pressure member with the sliding contact projection portions and the engagement convex portions inserted into the sliding contact concave portions and the engagement concave portions in the accommodation hole, so that the friction contact members of the piezoelectric device are brought into pressure contact with the driven body.

Consequently, the piezoelectric device accommodated in the accommodation hole of the position limiting member has two degrees of freedom around a direction perpendicular to the moving direction of the driven body due to action between the sliding contact projection portion of the holder member and the sliding contact concave portion of the accommodation hole in the position limiting member and around the moving direction due to action between the engagement convex portion and the engagement concave portion of the accommodation hole. When the holder member is pressed by the pressure member, the friction contact members can make profiling actions with respect to the driven body with the two degrees of freedom so that the piezoelectric device is installed such that the friction contact members and the driven body are brought into uniform contact with each other. Therefore, evenness of the contact can be enhanced without any influence on the processing accuracy and a simple and easy processing can be achieved thereby improving the drive efficiency.

As described above, the present invention can provide an ultrasonic motor capable of improving the drive efficiency by achieving a simple and easy processing work and then enhancement of uniformity of assembly by maintaining excellent contact.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a partial sectional view of an ultrasonic motor for explaining the schematic structure of the ultrasonic motor according to an embodiment of the present invention;

FIG. 2 is an exploded perspective view of a vibrator taken out of the ultrasonic motor in FIG. 1;

DETAILED DESCRIPTION OF THE INVENTION

Figure 3:
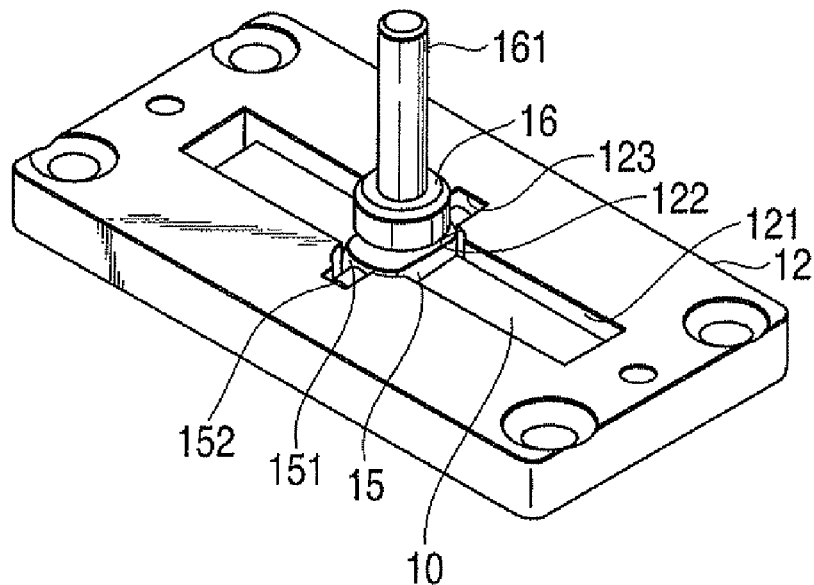
FIG. 3 is a perspective view showing the assembly condition of FIG. 2.

Hereinafter, an embodiment of the present invention will be described in detail with reference to the accompanying drawings.

FIG. 1 is a partial sectional view of the ultrasonic motor for explaining the schematic structure of the ultrasonic motor according to an embodiment of the present invention, A piezoelectric device 10 is composed of a plurality of laminated electrode plates, for example. The piezoelectric device (electrode plate) 10 is formed into a rectangular shape. When a voltage is applied to each electrode plate, the longitudinal vibration and flexural vibration of the piezoelectric device 10 are induced corresponding to the voltage thereby producing the elliptical vibration. Two friction contact members 11 are fixed to the bottom surface of the piezoelectric device 10, for example, the antinode (loop) of the flexural vibration with adhesive agent. The friction contact members 11 are spaced at a desired interval.

This piezoelectric device 10 is inserted into an accommodation hole 121 provided in a position limiting member 12 with the bottom face thereof, to which the friction contact members 11 are fixed, put therein first. The inserted piezoelectric device 10 is disposed within a casing 13 such that it is positioned and accommodated therein as described later. The friction contact members 11 are brought into pressure contact with a driven body 14 after it is inserted into the accommodation hole 121 and drive the driven body 14 by friction. As described above, the friction contact members 11 are provided on the bottom surface of the piezoelectric device 10 so as to move (friction drive) the driven body 14 by the elliptical vibration of the piezoelectric device 10. This driven body 14 is disposed such that it can be moved freely via rollers 9 within the casing 13. When the driven body 14 is driven by the friction contact members 11 by friction, the movement thereof is controlled via the rollers 9.

As shown in FIGS. 1 and 2, a mounting concave portion 101 is formed at a position corresponding to the node of the longitudinal vibration or the vicinity thereof on the top surface of the piezoelectric device 10 and a position corresponding to the node of the flexural vibration or the vicinity thereof. A holder member 15 for positioning and holding the piezoelectric device 10 on the casing 13 is fixed in the mounting concave portion 101 with for example, adhesive agent. That is, the holder member 15 is disposed corresponding to the mounting concave portion 101. In other words, the holder member 15 is disposed corresponding to the node of the longitudinal vibration of the top surface of the piezoelectric device 10 or in the vicinity thereof and the node of the flexural vibration or in the vicinity thereof. The holder member 15 is constructed as a vibrator. A curved sliding contact projection portion 151 is disposed on each of both end portions of the holder member 15. The sliding contact projection portions 151 disposed on both end portions are projected from two faces (side faces of the piezoelectric device 10 [holder member 15]) perpendicular to a moving direction of the driven body 14, so that they make a pair. The sliding contact projection portion 151 is projected from the side of the short side of the piezoelectric device 10 and installed. This sliding contact projection portion 151 has an engagement convex portion 152 having, for example, a cylindrical shape provided projectingly on the front end portion of the sliding contact projection portion 151.

The top face of the holder member 15 has a pressure target portion 153. A pressure member 16 is in contact with the pressure target portion 153. A shaft portion 161 is provided projectingly on this pressure member 16. This shaft portion 161 is inserted into an insertion hole 131 provided in the casing 13 such that it is movable freely after it is passed through an urging spring member 17 (see FIG. 1). Consequently, the pressure member 16 applies a spring force of the spring member 17 to the pressure target portion 153 (so as to press the holder member 15), so that the friction contact members 11 are brought into contact with the driven body 14 such that the driven body 14 can be driven by friction.

The holder member 15 is formed of any one of resin material and rubber material. The pressure member 16 is formed of a different material from the holder member 15, which is any one of resin material, rubber material and metal material. That is, if the holder member 15 is formed of for example, the resin material, the pressure member 16 is formed of the rubber material or the metal material. Alternatively, if the holder material 15 is formed of rubber material, the pressure member 16 is formed of the resin material or the metal material. In the meantime, the holder member 15 and the pressure member 16 may be formed of for example, the resin material if they have different properties.

Consequently, when the pressure member 16 presses the pressure target portion 153, propagation of vibration can be blocked between the pressure target portion 153 and the pressure member 16 so as to realize a stable and high-quality assembly of the friction contact members 11 and the driven body 14, thereby enhancing stabilization of the drive characteristic of the piezoelectric device 10. Consequently, vibration induced by the piezoelectric device 10 is propagated to the casing 13 through the shaft portion 161 thereby preventing vibration of the casing 13 under the characteristic frequency inherent in the casing 13 from being induced, so as to contribute to enhancement of the stabilization of the drive characteristic.

Mounting portions 132 are provided so as to be opposed to the driven body 14 within the casing 13. The position limiting member 12 is fixed on the mounting portions 132 with for example, screw members 18. This position limiting member 12 includes an accommodation hole 121 for accommodating the piezoelectric device 10. For example, a curved sliding contact concave portion 122 and a prismatic engagement concave portion 123 are provided on each side in the longitudinal direction of the accommodation hole 121. Then, the sliding contact projection portion 151 and the engagement convex portion 152 of the holder member 15 disposed on the piezoelectric device 10 are inserted into the sliding contact concave portion 122 and the engagement concave portion 123, respectively. In other words, the accommodation hole 121 has the sliding contact concave portion 122 in which the sliding contact projection portion 151 is accommodated such that it can make a sliding contact therewith freely and the engagement concave portion 123 in which the engagement convex portion 152 is accommodated, the sliding contact concave portion 122 and the engagement concave portion 123 being provided in each of inner wall faces in a direction perpendicular to the moving direction of the driven body 14.

The holder member 15 is installed in the mounting concave portion 101 such that the sliding contact projection portion 151 has a freedom around a direction (pitch direction) perpendicular to the moving direction (roll direction) of the driven body 14 with respect to the sliding contact concave portion 122 while the engagement convex portion 152 has a freedom around the moving direction of the driven body 14 with respect to the engagement concave portion 123. In this way, the piezoelectric device 10 is installed having two degrees of freedom within the casing 13 via the holder member 15 and the position limiting member 12.

With the above-described structure, the piezoelectric device 10 is accommodated in the accommodation hole 121 with the side of the friction contact members 11 put therein first. At this time, the holder member 15 is fixed in the mounting concave portion 101 (top face of the piezoelectric device 10) and the sliding contact projection portion 151 and the engagement convex portion 152 are inserted in the sliding contact concave portion 122 and the engagement concave portion 123. With this condition, the pressure member 16 is brought into contact with the pressure target portion 153. As regards this pressure member 16, the shaft portion 161 is passed through the spring member 17 and the front end portion of the shaft portion 161 is inserted into the insertion hole 131. The pressure member 16 applies a spring force of the spring member 17 to the pressure target portion 153. Consequently, the friction contact members 11 are brought into contact with the driven body 14.

At this time, the piezoelectric device 10 is accommodated in the casing 13 so as to have a freedom around a direction (pitch direction) perpendicular to the moving direction of the driven body 14 due to action between the sliding contact projection portion 151 and the sliding contact concave portion 122 and a freedom around the moving direction (roll direction) of the driven body 14 due to action between the engagement convex portion 152 and the engagement concave portion 123. Consequently, when the pressure target portion 153 is pressed by the pressure member 16, the piezoelectric device 10 makes profiling actions with two degrees of freedom around the pitch direction and the roll direction within the accommodation hole 121, so that the piezoelectric device 10 is installed within the casing 13 in a uniformly contact condition with respect to the driven body 14.

As a result, if a voltage is applied to the piezoelectric device 10 so that the longitudinal vibration and flexural vibration are induced thereby producing the elliptical vibration, the friction contact members 11 execute stable and efficient friction drive to the driven body 14.

At the time of the friction drive, propagation of vibration between the pressure member 16 and the pressure target portion 153 (holder member 15) is interrupted as described above, thereby preventing induction of vibration at a characteristic frequency possessed by other members (casing 13) than the piezoelectric device 10. From this viewpoints also, stable and high-quality friction drive can be carried out by the friction contact members 11 of the piezoelectric device 10.

As described above, in the ultrasonic motor, the holder member 15 fixed to the piezoelectric device 10 is provided with the curved sliding contact projection portion 151 having the engagement convex portion 152 in the direction perpendicular to the moving direction of the driven body 14 and the position limiting member 12 is provided with the accommodation hole 121 for accommodating the piezoelectric device 10. Then, the sliding contact concave portion 122 having the engagement concave portion 123 is provided in each of the inner wall faces of this accommodation hole 121. The piezoelectric device 10 is accommodated in the accommodation hole 121 of the position limiting member 12 and the sliding contact projection portion 151 and the engagement convex portion 152 of the holder member 15 are inserted into the sliding contact concave portion 122 and the engagement concave portion 123 of the accommodation hole 121. With this condition, the holder member 15 is pressed by the pressure member 16 so that the friction contact members 11 of the piezoelectric device 10 are kept in pressure contact with the driven body 14.

Consequently, the piezoelectric device 10 accommodated in the accommodation hole 121 has two degrees of freedom around the direction (pitch direction) perpendicular to the moving direction (roll direction) of the driven body 14 due to action between the sliding contact projection portion 151 and the sliding contact concave portion 122 and around the moving direction (roll direction) of the driven body 14 due to action between the engagement convex portion 152 and the engagement concave portion 123. When the pressure target portion 153 is pressed by the pressure member 16, the friction contact members 11 make profiling actions with the two degrees of freedom with respect to the driven body 14, so that the friction contact members 11 make contact therewith equally (uniformly) when the piezoelectric device 10 is installed.

As a result, evenness of the contact can be enhanced without any influence of the processing accuracy of the vibrator and a simple (convenient) and easy processing can be achieved thereby improving the drive efficiency.

Figure 4:
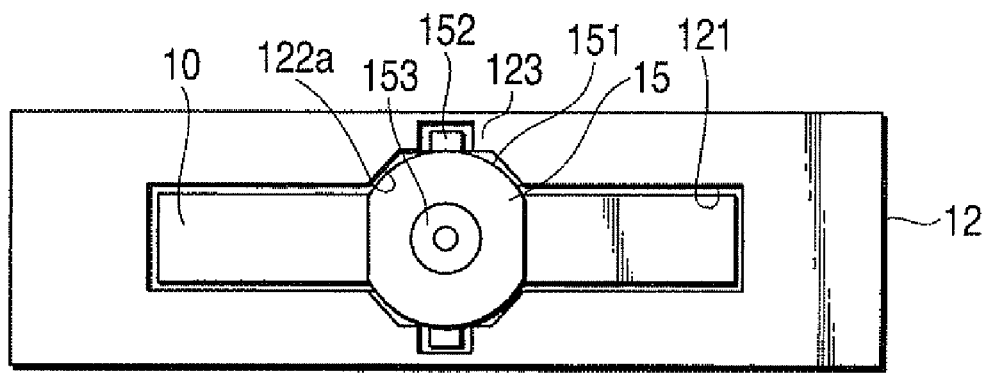
FIG. 4 is a top view of major portions of the ultrasonic motor taken out therefrom according to another embodiment of the present invention.

Although in the above embodiment, a case where the sliding contact concave portion 122 is formed in a curved shape has been described, the present invention is not limited to this example. For example, as shown in FIG. 4, it is permissible to form the engagement concave portion 123 in the accommodation hole 121 and chamfer the corner portions of the engagement concave portion 123 into a tapered shape to obtain the sliding contact concave portion 122a which corresponds to the sliding contact projection portion 151. Further, the sliding contact concave portion 122a containing the engagement concave portion 123 provided in the accommodation hole 121 may be formed into various shapes including a diamond shape and it is expected that any shape provides a valid effect.

Although in the above embodiment, a case where the engagement concave portion 123 is formed into a rectangular shape has been described, the present invention is not limited to this example, and it may be formed into other shapes.

Although in the above embodiment, a case where the engagement convex portion 152 of the holder member 15 is formed into a cylindrical shape has been described, the present invention is not limited to this example, and it may be formed into a polygonal shape or a bored cylinder and it is expected that the same valid effect is ensured.

Therefore, the present invention is not restricted to the above-described embodiment and on an execution stage, may be executed in various modifications within a scope not departing from the spirit of the invention. Further, the above-described embodiments contain various aspects of the invention and by combining the disclosed plural components appropriately, various other aspects of the invention can be extracted.

For example, even if some components are eliminated from the all the components indicated in the embodiment, if the problem to be solved can be solved and the effect to be attained is secured, the configuration from which those components are eliminated can be extracted as another aspect of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic motor which produces elliptical vibration by inducing longitudinal vibration and flexural vibration at the same time and drives a driven body by obtaining a drive power from the elliptical vibration, comprising:

a piezoelectric device;

friction contact members which are provided on one face of the piezoelectric device so as to move a driven body by the elliptical vibration of the piezoelectric device;

a holder member which positions and holds the piezoelectric device in a casing and is disposed corresponding to a node of the longitudinal vibration or in the vicinity thereof on the other face of the piezoelectric device and a node of the flexural vibration or in the vicinity thereof, the holder member having an engagement convex portion at the front end portion thereof and being provided with a pair of curved sliding contact projection portions which are projected from two faces perpendicular to the moving direction of the driven body;

a position limiting member which accommodates the piezoelectric device and has accommodation holes each constituted of a sliding contact concave portion for accommodating the sliding contact projection portion of the holder member such that it makes a sliding contact therewith freely and an engagement concave portion for accommodating the engagement convex portion of the sliding contact projection portion, the sliding contact concave portion and the engagement concave portion being provided in each of the inner wall faces in a direction perpendicular to the moving direction of the driven body; and a pressure member which presses the holder member so as to bring the friction contact members into pressure contact with the driven body.

2. The ultrasonic motor according to claim 1, wherein the engagement convex portion of the holder member has a cylindrical shape and the engagement concave portion of the accommodation hole in the position limiting member is formed in a prismatic shape.

3. The ultrasonic motor according to claim 2, wherein the sliding contact concave portion of the accommodation hole in the position limiting member is formed by chamfering.

4. The ultrasonic motor according to claim 3, wherein the holder member is formed of any one of resin material and rubber material and the pressure member is formed of a different material from the holder member, and is formed of any one of the resin material, the rubber material and metal material.

5. The ultrasonic motor according to claim 2, wherein the holder member is formed of any one of resin material and rubber material and the pressure member is formed of a different material from the holder member, and is formed of any one of the resin material, the rubber material and metal material.

6. The ultrasonic motor according to claim 1, wherein the sliding contact concave portion of the accommodation hole in the position limiting member is formed by chamfering.

7. The ultrasonic motor according to claim 6, wherein the holder member is formed of any one of resin material and rubber material and the pressure member is formed of a different material from the holder member, and is formed of any one of the resin material, the rubber material and metal material.

8. The ultrasonic motor according to claim 1, wherein the holder member is formed of any one of resin material and rubber material and the pressure member is formed of a different material from the holder member, and is formed of any one of the resin material, the rubber material and metal material.

* * * * *